United States Patent Office 3,544,983
Patented Dec. 1, 1970

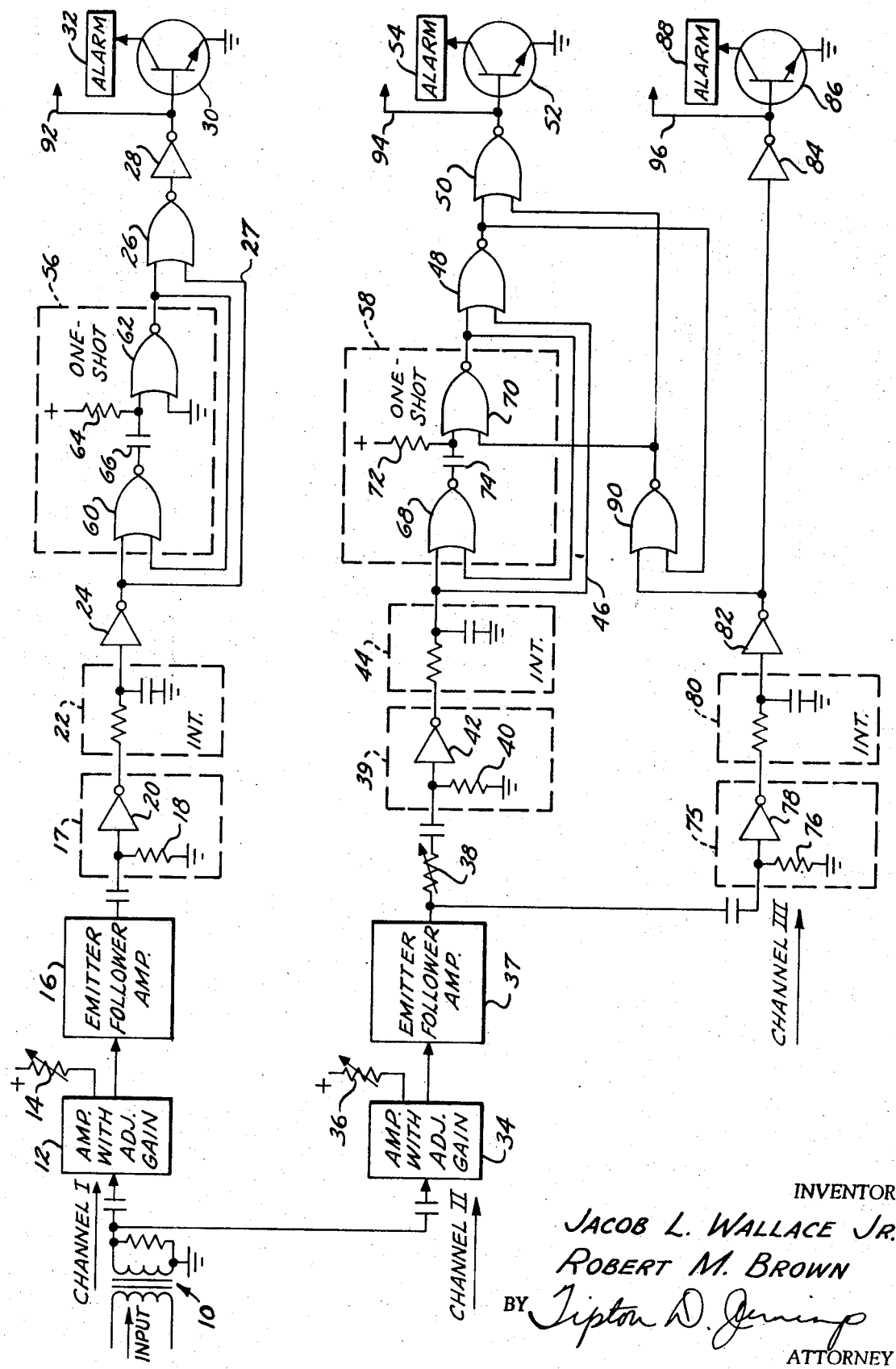

3,544,983
SIGNAL LEVEL DETECTOR
Jacob L. Wallace, Jr., Springfield, and Robert M. Brown, Arlington County, Va., assignors to The Susquehanna Corporation, Fairfax County, Va., a corporation of Delaware
Filed Sept. 30, 1968, Ser. No. 763,833
Int. Cl. G08b 19/00; H03k 5/20
U.S. Cl. 340—213
10 Claims

ABSTRACT OF THE DISCLOSURE

An embodiment of the signal level detector utilizes two channels, each of which is set at a desired threshold level. As long as the level of the monitored signal remains within the signal level range between the thresholds established by the two channels, no alarm is actuated. If the signal exceeds the upper threshold level or drops below the lower threshold level, an alarm is actuated.

BACKGROUND OF THE INVENTION

The present invention relates to a circuit for monitoring AC signals or tones and, more particularly, to a circuit for monitoring and indicating the energy level of such AC signals or tones.

In prior-art circuits of this general type two or more threshold levels are established by conventional circuitry and the signal to be monitored is fed to the threshold circuits. If the level of the signal exceeds any of the thresholds, an indicating or alarm circuit associated with the threshold circuit whose threshold has been exceeded is activated. These threshold circuits are usually set at a range of reference signal levels, and a person can ascertain the approximate level or magnitude of an input signal by observing which of the indicators or alarms are actuated.

The problems inherent in the prior-are circuits are many. For example, where the input signal is of an acceptable level yet exceeds one or more threshold levels, one or more alarms or indicators will be continually actuated. This requires an observer to monitor closely the indicators even though the signal level may be satisfactory because the same type of indication is given for an acceptable as well as an unacceptable condition; and the only way to ascertain when the signal reaches an unacceptable level is to watch the indicators continuously.

Where automatic monitoring of these circuits is desired, such as in a data collecting system, it is preferable from a data processing standpoint that no alarm occur unless the signal is at an undesirable level. This is because the data processing system normally receives a large number of inputs which must be processed and it is more efficient to condition the processing system to react only to faulty conditions. Otherwise, an unnecessary amount of processing or computing must be undertaken.

SUMMARY

Accordingly, it is one object of the present invention to provide an improved circuit for monitoring the level of an AC signal in which an alarm or indication is registered only when such level exceeds or falls below a signal level range.

Another object of the present invention is to provide such a circuit which lends itself to efficient monitoring, either by a human observer or electrical means.

Another object of the present invention is to provide such a circuit having the advantage of indicating when the input signal is absent.

A further object of the present invention is to provide such a circuit which indicates when the input signal has strayed outside of a signal level range by a predetermined amount, which, as an example, can alert the monitor that serious degradation of the input signal or associated equipment will or has occurred.

To improve the versatility of the circuit, as an additional object, adjustable means are provided to vary the threshold levels over a wide range thus permitting a wide range of input signals to be accommodated by the circuit and the quality of such signals ascertained.

Briefly, this invention comprises input means for receiving an AC signal and at least two channels for monitoring its level. In a first channel there is an amplifier with adjustable means for setting an upper threshold level, and in a second channel there is also an amplifier with adjustable means for setting a lower threshold level. If the input signal exceeds or drops below the range established by the thresholds, an associated indicating circuit reponds accordingly. Each channel also contains a charge accumulating circuit which is connected to the output of its channel amplifier, and which is adapted to develop a new level of charge when the input signal crosses the threshold level established at its associated channel amplifier.

Other object and advantages of the present invention will become apparent by a reading of the following specification together with the accompanying drawing which is described briefly below.

BRIEF DESCRIPTION OF THE DRAWING

In the sole figure there is shown a preferred embodiment of the present invention in both block diagram and circuit form.

DESCRIPTION OF THE PREFERRED EMBODIMENT

Referring now to the drawing there is shown a preferred embodiment of a signal level monitor which has, for purposes of aiding in an understanding of this invention, been divided into three channels, labeled Channel I, Channel II, and Channel III. The input to the monitor includes a transformer 10 for coupling into the line which carries the signals to be monitored.

In Channel I, amplifier 12 is connected to the input transformer 10 by way of a coupling capacitor. Amplifier 12 has an adjustable gain which is adjusted or varied by what is here shown as a variable resistor or potentiometer 14. This resistor controls the output level of amplifier 12 and sets an upper threshold level for the monitor. The output of amplifier 12 is applied to power amplifier 16 shown here as an emitter-follower.

Capacitance coupled to the output of amplifier 16 is a threshold detector 17 consisting of resistor 18 and inverter 20. The output of inverter 20 is connected to an integrating circuit 22 which charges or discharges depending upon the conducting state of inverter 20. The output of integrator 22 is applied to another inverter 24 which is connected directly to NOR gate 26 by line 27. The output of NOR gate 26 controls an inverter 28 which drives an indicating circuit consisting of transistor 30 and alarm 32.

Channel II is similar in construction to Channel I and is used to set the lower threshold for the signal level monitor. An amplifier 34 having an adjustable gain is connected to the input transformer 10 by a coupling capacitor. The means for adjusting or varying the gain of amplifier 34 is again a variable resistor or potentiometer 36. The output of amplifier 34 is applied to emitter-follower power amplifier 37.

The output of amplifier 37 is connected to resistor 38 whose function will be explained hereinafter in the description of Channel III. Resistor 38 is connected to a coupling

3 capacitor and the latter to a threshold detector 39 consisting again of a resistor 40 and inverter 42. The output of inverter 42 is connected to integrating circuit 44. At the output of integrator 44 there is no inverter 24 such as shown in Channel I. Instead, the output of integrator 34 is applied directly via line 46 to NOR gate 48. The output of NOR gate 48 is applied to another NOR gate 50 whose output drives an indicating circuit consisting of transistor 52 and alarm 54.

The operation of Channels I and II will now be explained. In Channel I the resistor 14 is adjusted to establish an upper threshold level. In Channel II, resistor 36 is adjusted to establish a lower threshold level. As long as the input signal which is being monitored stays within the signal level range established by the upper and lower thresholds, no alarm occurs at either of the indicating circuits for Channels I and II.

For example, an AC signal or tone appearing on the line being monitored will be applied by the transformer 10 to both Channels I and II. In both of these channels the signal is amplified by the respective amplifiers and applied to the threshold detectors. Since the signal is assumed to be within the acceptable level limits, the drop across resistor 18 in the threshold detector circuit 17 of Channel I will not exceed, or in other words, will always be less than approximately 1 volt. Accordingly, the output of inverter 20 remains constant. Integrator 22, which has been charged from the source (not shown) in inverter 20, remains charged. Inverter 24 remains in the same conducting state as does NOR gate 26 and inverter 28. Transistor 30 remains nonconducting and no alarm occurs at 32.

In Channel II, when the input signal is within acceptable limits, the signal at resistor 40 exceeds the 1-volt level on every positive excursion of each cycle. As a result the inverter circuit 42 changes its conducting state in response to each such positive excursion because the inverter conducting level of 1-volt is exceeded. A square-wave output is generated by this inverter. However, in the integrating circuit 44, the capacitor does not accumulate sufficient charge to effect a change-of-state for NOR gate 4. Therefore, NOR gate 50 remains unchanged, transistor 52 remains nonconducting, and alarm 54 is not triggered.

Therefore, as described, as long as the input signal or tone applied to Channels I and II remains within the signal level range established by the upper and lower threshold settings, no alarm or similar indication occurs.

Next assume that the input signal increases its level to the point where it exceeds the upper threshold level. First, in Channel II there is no alarm generated because the positive excursions of the signal appearing across resistor 40 still exceed the 1-volt level; however, in Channel I an alarm condition exists and how the alarm 32 is actuated is next described.

The input AC signal is amplified by amplifiers 12 and 16, and the positive excursions of the AC wave applied across resistor 18 in the threshold detector 17 now exceed the 1-volt conducting level of inverter 20. Hereinafter, True/False logic will be used to aid in the understanding of the operation. For each part of the positive cycle that exceeds the 1-volt level, inverter 20 provides a False output signal because of the change in its conducting state. Each time this False output occurs, the capacitor in integrator 22 discharges. The constants of the inverter 20 and integrator 22 are such that the capacitor in the integrator circuit does not re-acquire the dissipated charge during the portion of the AC tone when the inverter circuit returns to its first conducting state. As a result, the integrator circuit 22 rapidly discharges to a point which causes inverter 24 to switch conducting states. A True output is now applied by line 27 to NOR gate 26. The output of NOR gate 26 goes False but this is inverted by inverter 28 to a True signal. Transistor 30 saturates and triggers alarm 32. As long as the input signal is in excess of the upper threshold level, the just-described operation holds true, and the alarm 32 will remain actuated.

Assume next that the input signal level is within the preset range but now undergoes a drop in level below that of the lower threshold setting. In regard to Channel I, there is no change because the AC voltage at resistor 18 still does not exceed the 1-volt level. However, in Channel II when the amplified input signal is applied across resistor 40 in the threshold detector 39, it is found that the positive excursions of the AC signal no longer exceed the 1-volt level. Accordingly, inverter 42 ceases to switch back and forth from a first to a second conducting state as it did when the acceptable input signal was present, and instead switches to and remains in a conducting state in which its output is True. This output charges integrator 44 quickly, and this True level is applied by line 46 to NOR gate 48. The output of NOR gate 48 goes False but this is inverted by NOR gate 50 to a True signal. Transistor 52 saturates and activates alarm 54. As long as the input signal remains below the lower threshold of the signal level range, alarm 54 will remain activated.

As has just been described, it is now seen how this invention functions to provide an alarm indication when either the monitored input signal exceeds or falls below the signal level range which has been established by the upper and lower threshold settings.

Both Channel I and Channel II have a trigger circuit which is here shown constructed as a one-shot multivibrator and identified, respectively, by numbers 56 and 58. One-shot 56 is formed of two NOR gates 60 and 62 and an RC timing circuit comprising resistor 64 and capacitor 66. One-shot 58 is of identical construction and includes two NOR gates 68 and 70 and also an RC timing circuit comprising resistor 72 and capacitor 74.

The purpose of both one-shots is the same, namely, to insure that a fault or alarm condition which appears in the respective channels causes an alarm condition for a nominal time period as determined by the RC timing circuit in each one-shot. An example would be one-half second. Thus, if an alarm condition in either channel occurs for less than the half-second minimum, the alarm in that channel would still operate for this period.

This is accomplished in Channel I as follows. When an excessive input signal causes integrator 22 to discharge to a point where the output of inverter 24 switches to a True condition, this True signal is applied to NOR gate 60 and its output goes False. A False condition is now applied to the upper input of NOR gates 62 and its output goes from False to True. Capacitor 66 begins to discharge through resistor 64 and NOR gate 62 applies its True output state to the upper input of NOR gate 26 for the half-second RC timing period. Thus, even if the True signal on line 27 disappears because of the return of the monitored input signal to an acceptable level there is still one True input to NOR gate 26, and its output will remain False. The output of inverter 28 is accordingly True, transistor 30 is saturated and alarm 32 is triggered. Therefore, even if the signal being monitored should have only exceeded the upper threshold level momentarily, the making of an alarm is insured for at least one-half second.

In Channel II the one-shot 58 functions in the same manner as the one-shot 56 just described, but here the input NOR gate 68 switches to a False state in response to the level of integrator 44 going true when the monitored input drops below the lower threshold. As shown, there is no need for an inverter, such as inverter 24 in Channel I, between the integrator 44 and NOR gate 68 because the signal from this integrator is already True. Thus, in Channel II, if the signal being monitored should momentarily drop below the lower threshold level, one-shot 58 will be triggered and will insure that an alarm condition exists for at least the timing period, here set at one-half second, of this one-shot.

In the operation of Channels I and II, a signal level monitor has been described in which an alarm 32 or 54 will respond only if the monitored input signal exceeds or falls below a signal level range. However, there is no way to ascertain the extent to which the input signal exceeds or drops below this range. At times, it might be desirable to have some idea of signal deterioration. For example, is an alarm on Channel II being caused by a complete loss of signal or by a signal which is just below the lower threshold level? Channel III is provided to enable such determination.

Channel III is capacitively coupled to the output of emitter-follower amplifier 37 in Channel II. Channel III contains a threshold detector 75 comprised of resistor 76 and inverter 78. The output of this inverter is connected to an integrator 80 whose output is, in turn, connected to another inverter 82. The output of inverter 82 drives yet another inverter 84 whose output is connected to transistor 86 in the indicating circuit. Also in this indicating circuit is an alarm 88.

Because Channel III is connected to the output of the amplifier stages of Channel II, it gives an alarm should the signal being monitored drop a predetermined amount below the lower threshold setting of Channel II. Resistor 38 in Channel II is used to preset the threshold level to which Channel III will respond. Assume that it is desired to have Channel III respond should the input signal disappear completely or drop 10 db below the lower threshold setting of Channel II. Resistor 38 is adjusted to a position which will attenuate the signal in Channel II such that when the lower threshold of Channel II is subsequently set, the threshold of Channel III will be approximately 10 db higher. Therefore, until such time as the input signal being monitored drops 10 db below the lower threshold setting of Channel II, Channel III will not be triggered.

In operation, Channel III functions in the same manner as Channel II. When the input signal being monitored drops 10 db below the level setting of Channel II, the positive excursions of the AC signal appearing across resistor 76 no longer exceed the 1-volt level. The inverter 78 switches its conducting states and its output goes True. Integrator 80 begins to accumulate a charge and reaches a level which switches inverter 82 from a True to a False output condition. This False input is applied to inverter 84 and its output goes True. Transistor 86 saturates and the alarm 88 is actuated. This tells the observer that the input signal is at least 10 db below the lower threshold or, in an appropriate communication system, that this drop is indicative of complete signal loss.

When alarm 88 is actuated, it is preferred that the alarm condition be removed in Channel II, and NOR gate 90 is provided to achieve this end. When the output of inverter 82 goes False in response to the occurrence of an input signal 10 db below the lower threshold level, the upper input of NOR gate 90 also goes False. As described previously, the output of NOR gate 48 in Channel II is already False because it has been switched by a True input condition from integrator 44. Therefore, there are now two False inputs to NOR gate 90, and its output goes True. This True condition is applied as a clamp to NOR gate 70 to inhibit operation of the one-shot 58 and to NOR gate 50 to return and hold its output to a False state. As a result, transistor 52 cuts off and alarm 54 terminates, and an alarm condition appears only at the output of Channel III.

Note, however, that should the monitored input signal now increase to a level where it is less than 10 db below the setting of Channel II, Channel III will no longer be actuated and alarm 88 will terminate. At the same time, the output of inverter 82 will return to a True state causing the output of NOR gate 90 to once again go False. This removes the clamps from NOR gates 70 and 50 in Channel II. With Channel II still actuated by the input signal being below its threshold level, there is still a True signal on line 46 and the output of NOR gate 48 is still in a False state. As a result, two False inputs are again applied to NOR gate 50 and its output goes True to saturate transistor 52 and cause alarm 54 to respond.

In view of the above discussion of Channel III, it is now apparent that one or more channels similar in function to Channel III can be provided. For example, another channel can be associated with Channel I so that an alarm is obtained when the input signal exceeds the upper threshold level by a preset amount. In such case a resistor, the same as resistor 38 in Channel II, can be inserted at the corresponding point in Channel I and adjusted to give the desired db separation between the Channel I and this additional channel.

The setting of the thresholds of Channel I and Channel II can be readily accomplished by the use of conventional test equipment. For example, an audio oscillator having a variable output level is connected across the input and is first set at the level for which the upper threshold is desired. Potentiometer 14 is next adjusted until the alarm 32 is just actuated. This establishes the upper threshold level. The audio oscillator is next set at the level corresponding to the desired lower threshold level of Channel II. Potentiometer 36 is now varied until alarm 54 is just actuated and the lower threshold level is now established. If Channel III is to be utilized, variable resistor 38 is first adjusted for the desired db separation between Channels II and III before Channel II is set.

As explained previously, the adjustable means 14 and 36 associated with amplifiers 12 and 34, respectively, vary the gain of these amplifiers. This gives a wide dynamic range for each of these amplifiers and permits each of the channels and thereby the monitor itself to accommodate a wide range of input signal levels.

At the input to each of the alarm circuits is an output line 92, 94, or 96. This line permits access to the channel alarm for automatic monitoring purposes. Normally, in the absence of an alarm condition at any channel, all three lines are False. When an alarm occurs in any channel, the line 92, 94, or 96 associated with that channel goes True. This change in output state is then detected by a data collecting system (not shown) and processed.

What is claimed is:

1. A circuit for monitoring an AC signal and indicating when the level of such signal exceeds or falls below a signal level range comprising:
   (1) input means for receiving an AC signal;
   (2) a first amplifier connected to said input means, said first amplifier comprising:
      (a) adjustable means for setting an upper threshold level for a signal level range;
   (3) a second amplifier connected to said input means, said second amplifier comprising:
      (a) adjustable means for setting a lower threshold level for said signal level range;
   (4) a first charge accumulating circuit connected to the output of said first amplifier, and adapted to develop a new level of charge in response to the presence of an AC signal of a level in excess of said upper level;
   (5) a second charge accumulating circuit connected to the output of said second amplifier, and adapted to develop a new level of charge in response to the presence of an AC signal of a level below that of said lower level;
   (6) a first indicating circuit responsive to the attainment of a new level of charge of said first charge accumulating circuit to indicate that an AC signal has been monitored having a level which exceeds the signal level range; and
   (7) a second indicating circuit responsive to the attainment of a new level of charge of said second charge accumulating circuit to indicate that an AC signal has been monitored having a level which falls below the signal level range.

2. A circuit as claimed in claim 1 further comprising:
(1) a first threshold detector connected between said first amplifier and said first charge accumulating circuit, said first threshold detector providing a first threshold output when said AC signal exceeds said upper level;
(2) and wherein said first charge accumulating circuit is adapted to develop a new level of charge in response to said threshold output of said first threshold detector.

3. A circuit as claimed in claim 2 further comprising:
(1) a second threshold detector circuit connected between said second amplifier and said second charge accumulating circuit, said second threshold detector providing a second threshold output when said AC signal drops below said lower level;
(2) and wherein said second charge accumulating circuit is adapted to develop a new level of charge in response to said threshold output of said second threshold detector.

4. A circuit as claimed in claim 3 wherein:
(1) said adjustable means for each of said first and second amplifiers includes individual means for adjusting the gain control of each of said amplifiers.

5. A circuit as claimed in claim 4 wherein:
(1) said first charge accumulating circuit includes a first integrating circuit; and
(2) said second charge accumulating circuit includes a second integrating circuit.

6. A circuit as claimed in claim 5 further comprising:
(1) a first trigger circuit interposed between said first integrating circuit and said first indicating circuit to insure that an indication occurs for at least the timing period of said first trigger circuit in the event that said first integrating circuit only momentarily attains said new level of charge; and
(2) a second trigger circuit interposed between said second integrating circuit and said second indicating circuit to insure that an indication occurs for at least the timing period of said second trigger circuit in the event that said second integrating circuit only momentarily attains said new level of charge.

7. A circuit as claimed in claim 6 wherein said first threshold detector includes:

(1) an inverter circuit which causes said first threshold output to occur by switching from a first to a second conducting state when said AC signal exceeds said upper level;

and said second threshold detector includes:
(2) an inverter circuit which causes said second threshold output to occur by switching from a first to a second conducting state when said AC signal drops below said lower level.

8. A circuit as claimed in claim 1 further comprising:
(1) at least one additional charge accumulating circuit connected to the output of one of said amplifiers;
(2) means for causing said additional charge accumulating circuit to develop a new level of charge in response to the presence of an AC signal which is separated from said signal level range by a preset amount; and
(3) a third indicating circuit responsive to the attainment of a new level of charge of said additional charge accumulating circuit to indicate that an AC signal has been monitored having a level which is separated from the signal level range by a preset amount.

9. A circuit as claimed in claim 8 further comprising:
(1) means responsive to the attainment of a new level of charge of said additional charge accumulating circuit for preventing an indication from occurring at one of said first and second indicating circuits.

10. A circuit as claimed in claim 9 further comprising:
(1) a third threshold detector connected between said second amplifier and said additional charge accumulating circuit, said third threshold detector providing a third threshold output when said AC signal is separated from said signal level range by a preset amount.

References Cited
UNITED STATES PATENTS

| | | | |
|---|---|---|---|
| 3,191,073 | 6/1965 | Mooney | 307—235 |
| 3,478,255 | 11/1969 | Parker et al. | 307—235X |
| 3,496,493 | 2/1970 | Nielsen | 307—235X |
| 3,341,816 | 9/1967 | Davis et al. | 328—116X |

STANLEY M. URYNOWICZ, JR., Primary Examiner

U.S. Cl. X.R.

307—235; 328—116; 340—172